Figure 1:
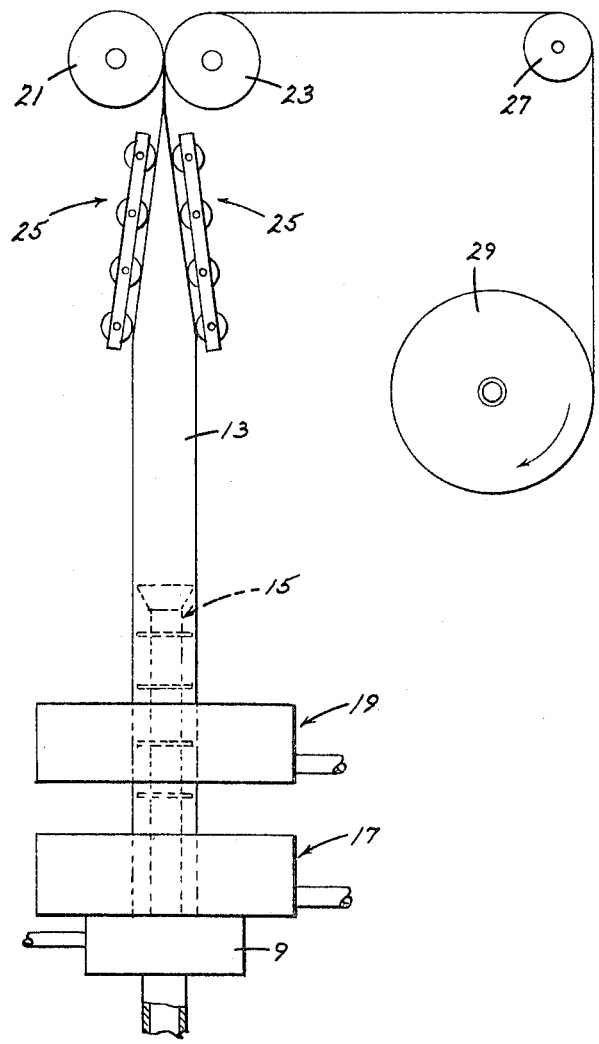

Nov. 8, 1966 H. A. HALEY 3,284,552

METHOD FOR MAKING TUBING

Original Filed Oct. 1, 1962 2 Sheets-Sheet 1

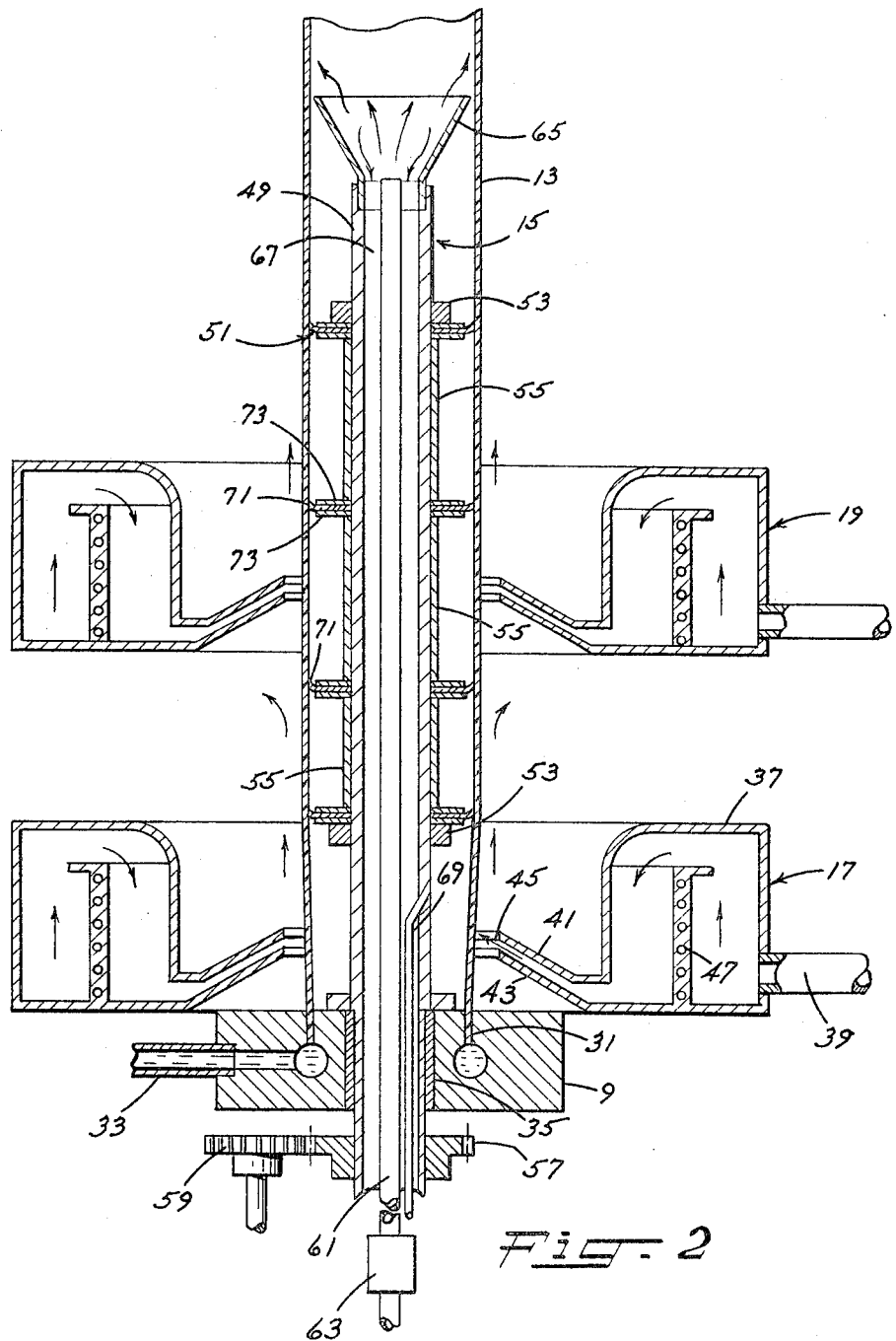

United States Patent Office 3,284,552
Patented Nov. 8, 1966

3,284,552
METHOD FOR MAKING TUBING
Harold A. Haley, Secane, Pa., assignor to FMC Corporation, Philadelphia, Pa., a corporation of Delaware
Original application Oct. 1, 1962, Ser. No. 227,234. Divided and this application Mar. 17, 1964, Ser. No. 352,453
7 Claims. (Cl. 264—70)

This application is a division of my application Serial No. 227,234, filed October 1, 1962 and entitled, "Mandrel for Forming and Oscillating Extruded Plastic Tubes."

This invention relates to the manufacture of thermoplastic tubing, and more particularly to an improved method for producing continuous seamless tubing from molten thermoplastic materials.

In one method of manufacturing tubing, a molten thermoplastic material is extruded through an annular die to form a seamless tubing which is drawn from the die by wind-up rolls driven at a speed sufficient to stretch the tubing while it is in a formative plastic state. Between the point of extrusion and the wind-up rolls the tubing is inflated to a predetermined diameter by means of air or other gaseous medium to form an isolated gaseous bubble confined between the extrusion die and the nip of the wind-up rolls. Setting of the inflated thermoplastic tubing is achieved by directing a controlled flow of air on and around the tubing.

With production speeds of less than about 30 feet per minute, comparatively little variation is apparent in the lay-flat dimension of the resulting collapsed tubing. Aside from the standpoint of cost, production at such slow speeds often involves degradation of the thermoplastic material as a result of its slower travel through the extruding means and thus entails greater waste and down-time of the apparatus.

In another procedure, a freshly extruded tubing of thermosplastic material is drawn over a metallic temperature modifying former of predetermined diameter while the tubing is still in the formative, plastic state. It has been found, however, that the metallic temperature modifying former tends to adhere with or grab the hot extruded tubing, thus rupturing the tubing or otherwise interrupting the extrusion process.

An added disadvantage of the above-noted procedures, as well as other known methods for making tubing, is that the resulting tubing exhibits thick and thin bands or longitudinally extending elements which differ in thickness. Such differences in thickness along the tubing wall are generally attributed to one or a combination of such factors such as, temperature or pressure differentials around the annular die, deposits of foreign material within the die, improper die construction or adjustment, or nonuniform cooling of the extruded tubing. Generally, the differences in thickness between such elements of the tubing wall are minute but become quite evident when laid upon themselves numerous times. It will be apparent, that when wound in roll form each added layer of such tubing is deformed more than the previous layer and soon reaches undesirable proportions. Furthermore, such deformation of the wound tubing becomes set after a relatively short storage period, and not only renders the tubing difficult to print but also unsuitable as a package wrapping material. Accordingly, a primary object of this invention is to provide a new or generally improved and more satisfactory method for manufacturing thin-walled plastic tubing.

Another object is the provision of a method for manufacturing a thin-wall tubing having substantially the same lay-flat dimension along its entire length.

Still another object is the provision of an improved method for forming thin-walled plastic tubing and collecting the same as a roll, with elements of the tubing wall which differ in thickness being laterally offset from each other in adjacent layers of the wound tubing.

Still further objects will appear from the following description.

These objects are accomplished in accordance with the present invention by a method in which a freshly extruded seamless tubing formed of thermoplastic material is expanded to and maintained at a desired diameter by being drawn over a mandrel while the tubing is still in a comparatively plastic or formative condition. The mandrel includes a supporting conduit which extends through and projects beyond the tubing extrusion die, and a plurality of disc assemblies fixed to the supporting conduit at spaced intervals. The disc assemblies each includes a pair of annular metallic plates which are slightly smaller in diameter than the desired internal diameter of the tubing being formed, and a sheet or fabric piece which is interposed between the metallic plates and projects beyond the peripheral edges thereof.

A second conduit is disposed within the mandrel supporting conduit and serves to deliver gas suspended powders into and against the internal surface of the tubing as it travels beyond the last of the mandrel disc assemblies. The two conduits are spaced from each other so that excess powder may be removed through the passage provided therebetween.

In the preferred method of the present invention, the mandrel is oscillated so as to impart a similar oscillating movement to the extruded tubing and thereby insure that the tubing, when subsequently collapsed, is flattened along fold lines which occur along successively different longitudinal elements of the tubing wall.

In the drawing, FIGURE 1 is a diagrammatic illustration of the apparatus for practicing the method of the present invention; and FIGURE 2 is an enlarged sectional view of a portion of the apparatus shown in FIGURE 1.

With reference to the drawing, FIGURE 1 diagrammatically illustrates an annular die 9 from which a molten thermoplastic material may be continuously extruded as a seamless thin-walled tubing 13. The freshly extruded seamless tubing 13 is sized or expanded to a desired diameter as it is drawn over the periphery of a mandrel 15, and is cooled or set by air on other gaseous medium impinged against the outer surface of the tubing wall by air rings 17 and 19. A pair of nip rolls 21 and 23 serve to continuously withdraw the tubing 13 away from the point of extrusion and also maintain the tubing in a flattened condition after it has been collapsed by a pair of cooperating frames 25. After leaving the nip rolls 21 and 23, the flattened tubing is passed over a guide roll 27 and is wound upon itself as a roll 29.

As shown on an enlarged scale in FIGURE 2, the die 9 includes an annular orifice 31, which is operatively connected to a conventional extruder by a conduit 33, and a central opening 35 through which extends the mandrel 15. The air rings 17 and 19 are of identical construction, each including a ring-shaped housing 37 into which a gaseous cooling medium is delivered by a conduit 39, walls 41 and 43 which project from the inner periphery of the housing 37 and together provide a distribution orifice 45, and an internal partition 47 within which suitable cooling coils are embedded for chilling the gaseous medium as it travels within the housing.

The mandrel 15 includes a supporting conduit 49 and a plurality of disc assemblies 51 which are preferably fixed to the conduit 49 at longitudinally spaced intervals, as by clamp rings 53 and tubular spacers 55. A gear 57 is fixed to the mandrel supporting conduit 49 and meshes with a gear 59 driven by a conventional reversible motor, not shown, for oscillating the mandrel 15 periodically or continuously, as more fully described hereafter. To facilitate powdering or dusting of the internal surface of the extruded tubing, a mixture of suitable powder and air or other gaseous medium is delivered through the mandrel 15 by a conduit 61 which is connected to a suitable pump 63. Excess dusting powder is collected by a funnel 65 fixed to the end of the conduit 49 and is exhausted from within the tubing 13 through a passage 67 which exists between the conduits 49 and 61.

Since the thermoplastic material is still in a molten condition when it issues from the die 9, air or other gaseous medium is delivered by a pipe 69 into that portion of extruded tubing 13 which extends between the die 9 and the first of the series of disc assemblies 51 to thus enable the same to withstand the force of the cooling medium delivered by the cooling ring 17. It will be noted that the pipe 69 is disposed within and extends through the wall of the mandrel supporting conduit 49.

In practicing the method of the present invention with the apparatus described, a molten thermoplastic film-forming material, as for example polyvinyl chloride, is supplied to the die 9 by a conduit 33 and is continuously extruded through the die orifice 31 as the seamless tubing 13. The freshly extruded tubing is drawn over the mandrel 15, between the collapsing frames 25 and the nip rolls 21 and 23, and is then collected as a roll 29. As the tubing is advanced relative to the mandrel 15, it is sized or expanded to a desired diameter by the disc assemblies 51 and set or chilled to a generally solid condition by cool air or other gas delivered by the cooling rings 17 and 19. In addition, air is delivered by the pipe 69 into that portion of the tubing 13 nearest to the die 9 so as to prevent the same from collapsing under the force of the cooling medium issuing from the ring 17. Concomitantly with the extrusion operation, the conduit 61 and pump 63 deliver a mixture of air and suitable powders, as for example starch or talc powder, into that portion of the tubing 13 moving beyond the mandrel 15. Such powders serve to coat or dust the internal surface of the tubing 13 and thus prevent the same from adhering when the tubing is subsequently collapsed and collected in a flattened condition. Excess powder is collected by the funnel 65 and vented through the passage 67.

As seen in FIGURE 2 of the drawing, a significant degree of sizing of the tubing occurs as the freshly extruded tubing 13 travels from the die orifice 31 to the first of the series of mandrel disc assemblies 51. The remaining disc assemblies are essential, however, since they assist in completing the sizing of the tubing and maintain the tubing in its sized condition until it is substantially set. It is made clear that sizing of the tubing 13 is effected primarily by the disc assemblies 51 and that no reliance is placed upon the gaseous medium delivered by the pipe 69 for achieving this particular function.

The mandrel disc assemblies 51 are of the same construction, each including an annular sheet or fabric piece 71 and a pair of rigid metallic supporting plates 73. The plates 73 must not engage with the tubing wall, yet must be of such diameter as to support the fabric piece 71, as shown in FIGURE 2, with its peripheral edge engaged with the internal surface of the tubing 13. The diameter of the fabric piece 71 will vary with such factors as the fabric thickness and diameter or support provided by the discs 73. Satisfactory sizing of the tubing has been achieved by employing disc assemblies in which the fabric piece 71 is about one-eighth of an inch larger than the desired diameter of the tubing being formed while the metallic discs are about one-eighth inch smaller than such tubing diameter.

The fabric pieces 71 of the disc assemblies 51 are formed of materials which do not soften under the particular elevated temperature employed and which possess sufficient strength to withstand continuous rubbing engagement with the tubing wall. Disc assemblies 51 having annular sheets or fabric pieces 71 formed of natural and/or synthetic fibers, as for example wool and "Teflon" fibers are satisfactory, providing the tubing 13 is cooled to such a degree as to prevent the same from sticking to or grabbing with the fabric pieces. It is preferred, however, that the annular sheets or fabric pieces 71 be formed of inorganic refractory materials, such as asbestos, glass, and slag or mineral fibers. Such annular sheets or fabric pieces 71 possess the necessary characteristics as heretofore noted and permit high speed production without the need of complicated and expensive air cooling equipment.

The number and spacing of the disc assemblies can be varied to suit particular operating conditions. Essentially, an adequate number of disc assemblies 51 should be provided to support the tubing 13 while it is still in a plastic and formative condition. Further, such assemblies should be positioned sufficiently close so as to prevent deformatiin of the tubing as it travels between adjacent assemblies.

As heretofore mentioned, the mandrel 15 may be periodically or continuously oscillated about its longitudinal axis by a reversible motor through meshing gears 57 and 59. Such movement of the mandrel 15 imparts a similar movement to the tubing 13 simultaneously with its continuous advancement relative to the mandrel. As a result of such oscillation of the tubing 13, as it travels toward and between the collapsing frames 25, the longitudinal fold lines formed by the nip rolls 21 and 23 occur along successively different longitudinal elements of the tubing wall so that successive convolutes of such elements of the tubing are laterally offset from each other in the roll 29.

It will, of course, be understood that the teachings of the present invention are useful with a variety of thermoplastic film-forming materials and operating conditions.

It is to be understood that changes and variations may be made without departing from the spirit and scope of the invention as defined in the appended claims.

I claim:

1. A method of forming and collecting thermoplastic seamless tubing including the steps of continuously extruding a flowable film-forming material in the form of a seamless tubing having longitudinally extending elements which differ in thickness, continuously advancing the tubing away from the point of extrusion and engaging its internal surface with a mandrel to expand the tubing to a desired size, setting the extruded tubing concomitantly with the advancement thereof, collapsing the tubing after it leaves the mandrel, collecting the flattened tubing in the form of a roll, and rotating the mandrel in opposite directions to oscillate the expanded portion of the tubing relative to the collapsed portion thereof whereby successive convolutes of an element of the tubing are laterally offset from each other on said roll.

2. A method of forming and collecting thermoplastic seamless tubing including the steps of continuously extruding a molten thermoplastic material in the form of a seamless tubing having longitudinally extending elements which differ in thickness, continuously withdrawing the tubing from the point of extrusion, advancing the extruded tubing and engaging its internal surface with a mandrel to expand the tubing to a desired diameter, impinging a cooling gas against the outer surface of the extruded tubing at least during its advancement relative to the mandrel, maintaining a substantially constant volume of gaseous medium within the tubing between the point of extrusion and mandrel to counteract the force of the impinging cooling gas, collapsing the tubing after it leaves the mandrel, collecting the flattened tubing in the form of a roll, and rotating the mandrel in opposite directions to oscillate the tubing about its longitudinal axis concomitantly with its advancement whereby successive convolutes of an element of the tubing are laterally offset from each other on said roll.

3. A method as defined in claim 2 further including the step of powering the internal surface of the tubing as it travels beyond the mandrel.

4. A method as defined in claim 3 wherein the internal surface of the tubing is powdered with non-adhesive powders suspended within a gaseous medium circulated within the tubing as it leaves the mandrel.

5. A method of producing seamless tubing including the steps of continuously extruding a flowable film-forming material in the form of a seamless tubing, continuously advancing the tubing away from the point of extrusion, engaging the internal surface of the extruded tubing with at least one annular, flexible, non-metallic member to expand the same to a desired size, setting the tubing during the advancement thereof, collapsing the expanded tubing into a flattened condition, collecting the flattened tubing in the form of a roll, and moving the annular member about its axis to impart a similar movement to the expanded portion of the tubing concomitantly with its advancement whereby longitudinally extending elements of the tubing which differ in thickness are laterally offset from each other on said roll.

6. A method of producing seamless tubing including the step of continuously extruding a flowable film-forming material in the form of a seamless tubing, continuously advancing the tubing away from the point of extrusion into engagement with and over a mandrel having at least one annular sheet which is formed of non-metallic material and is flexible at least along its peripheral portion, said sheet having a diameter at least equal to the diameter desired in the finished tubing, setting the tubing during the advancement thereof toward and over the mandrel, collapsing the expanded tubing into a flattened condition, collecting the flattened tubing in the form of a roll, and moving the mandrel about its axis whereby the portion of the tubing engaged with the mandrel is moved relative to the collapsed portion thereof so that longitudinally extending elements of the tubing which differ in thickness are laterally offset from each other on said roll.

7. A method of producing and collecting seamless tubing including the steps of continuously extruding a flowable film-forming material in the form of a seamless tubing, continuously advancing the tubing away from the point of extrusion, engaging the internal surface of the extruded tubing with a series of longitudinally spaced annular, flexible, nonmetallic members to expand the same to a desired size, setting the tubing during the advancement thereof, collapsing the tubing into a flattened condition after expansion thereof, collecting the flattened tubing in the form of a roll, and rotating the series of annular members together alternately in opposite directions to oscillate the tubing whereby longitudinally extending elements thereof which differ in thickness are laterally offset from each other on said roll.

References Cited by the Examiner

UNITED STATES PATENTS

| | | |
|---|---|---|
| 1,196,648 | 8/1916 | Bleecker. |
| 2,697,852 | 12/1954 | Bailey _____ 264—95 |
| 2,814,071 | 11/1957 | Allan et al. _____ 254—95 X |
| 2,966,700 | 1/1961 | Dyer _____ 264—95 |
| 3,161,942 | 12/1964 | Cheney _____ 264—146 X |

FOREIGN PATENTS 1,106,951   5/1961   Germany.

ALEXANDER H. BRODMERKEL, *Primary Examiner.*

ALFRED L. LEAVITT, *Examiner.*

A. R. NOE, *Assistant Examiner.*